US011776720B2

(12) United States Patent
Tanioku et al.

(10) Patent No.: US 11,776,720 B2
(45) Date of Patent: *Oct. 3, 2023

(54) CALCINED FERRITE, AND SINTERED FERRITE MAGNET AND ITS PRODUCTION METHOD

(71) Applicant: PROTERIAL, LTD., Tokyo (JP)

(72) Inventors: Yasuaki Tanioku, Tokyo (JP); Yushi Yoshimitsu, Tokyo (JP); Yoshinori Kobayashi, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,696

(22) Filed: Apr. 20, 2022

(65) Prior Publication Data

US 2022/0246338 A1 Aug. 4, 2022

Related U.S. Application Data

(62) Division of application No. 17/171,036, filed on Feb. 9, 2021, now Pat. No. 11,404,188.

(30) Foreign Application Priority Data

| Mar. 24, 2020 | (JP) | 2020-051978 |
| Sep. 18, 2020 | (JP) | 2020-156832 |
| Dec. 25, 2020 | (JP) | 2020-215957 |

(51) Int. Cl.
| *H01F 1/11* | (2006.01) |
| *H01F 1/03* | (2006.01) |
| *H01F 1/08* | (2006.01) |
| *H01F 41/02* | (2006.01) |

(52) U.S. Cl.
CPC ........... *H01F 1/11* (2013.01); *H01F 41/0266* (2013.01)

(58) Field of Classification Search
CPC . H01F 1/11; H01F 1/0315; H01F 1/00; H01F 1/0536; H01F 1/086
See application file for complete search history.

(56) References Cited

U.S. PATENT DOCUMENTS

| 9,601,248 | B2 | 3/2017 | Oda et al. | |
| 11,404,188 | B2* | 8/2022 | Tanioku | C04B 35/2633 |
| 2006/0284136 | A1* | 12/2006 | Takami | C04B 35/63 |
| | | | | 252/62.63 |
| 2009/0022992 | A1 | 1/2009 | Takami et al. | |
| 2009/0218540 | A1 | 9/2009 | Takami et al. | |
| 2009/0314981 | A1* | 12/2009 | Yanagida | C04B 35/632 |
| | | | | 252/62.55 |
| 2012/0105185 | A1* | 5/2012 | Oda | H01F 1/0557 |
| | | | | 335/302 |
| 2012/0280167 | A1 | 11/2012 | Yanagida et al. | |
| 2015/0170811 | A1 | 6/2015 | Tanigawa et al. | |
| 2015/0221424 | A1 | 8/2015 | Kobayashi et al. | |
| 2015/0262741 | A1 | 9/2015 | Oda et al. | |
| 2015/0332819 | A1 | 11/2015 | Oda et al. | |
| 2021/0304930 | A1 | 9/2021 | Tanioku et al. | |

FOREIGN PATENT DOCUMENTS

| EP | 2006864 A1 | 12/2008 |
| EP | 2881956 A1 | 6/2015 |
| JP | 2009-246243 A | 10/2009 |
| JP | 2010-001171 A | 1/2010 |
| JP | 2011-213575 A | 10/2011 |
| JP | 2018-030751 A | 3/2018 |
| KR | 10-2012-0047245 A | 5/2012 |
| WO | 2007/060757 A1 | 5/2007 |
| WO | 2007/105398 A1 | 9/2007 |
| WO | 2008/105449 A1 | 9/2008 |
| WO | 2011/004791 A1 | 1/2011 |
| WO | 2014/034401 A1 | 3/2014 |
| WO | 2018/117261 A1 | 6/2018 |

OTHER PUBLICATIONS

Extended European Search Report dated Aug. 4, 2021 in European Application No. 21156629.4.
Office Action dated Dec. 6, 2021 from the Korean Intellectual Property Office in KR application No. KR10-2021-0019785.

* cited by examiner

*Primary Examiner* — Matthew E. Hoban
(74) *Attorney, Agent, or Firm* — Sughrue Mion, PLLC

(57) ABSTRACT

A sintered ferrite magnet having a composition of metal elements of Ca, R, A, Fe and Co, which is represented by the general formula of $Ca_{1-x-y}R_xA_yFe_{2n-z}Co_z$, wherein R is at least one of rare earth elements indispensably including La; A is Sr and/or Ba; x, y, z and n represent the atomic ratios of Ca, R, A, Fe and Co; $2n$ represents a molar ratio expressed by $2n=(Fe+Co)/(Ca+R+A)$; and x, y, z and n meet the conditions of $0.15 \leq x \leq 0.35$, $0.05 \leq y \leq 0.40$, $(1-x-y) > y$, $0 < z \leq 0.18$, and $7.5 \leq (2n-z) < 11.0$.

15 Claims, No Drawings

CALCINED FERRITE, AND SINTERED FERRITE MAGNET AND ITS PRODUCTION METHOD

CROSS REFERENCE TO RELATED APPLICATIONS

This is a divisional of application Ser. No. 17/171,036 filed Feb. 9, 2021, which claims priority from Japanese Patent Application Nos. 2020-051978 filed Mar. 24, 2020, 2020-156832 filed Sep. 18, 2020, and 2020-215957 filed Dec. 25, 2020; the disclosure of application Ser. No. 17/171,036 is hereby incorporated by reference.

FIELD OF THE INVENTION

The present invention relates to a sintered ferrite magnet having an adjusted composition of metal elements of Ca, R, A, Fe and Co for exhibiting high magnetic properties even with a smaller Co content than those in conventional SrLaCo magnets and CaLaCo magnets, and its production method, and calcined ferrite for providing such a sintered ferrite magnet.

BACKGROUND OF THE INVENTION

Sintered ferrite magnets have excellent cost performance and extremely high chemical stability because their main raw material is inexpensive iron oxide, despite that their maximum energy products are only 1/10 of those of sintered rare earth magnets (for example, sintered NdFeB magnets). Accordingly, they are used for various applications such as motors, speakers, etc., and they are globally produced in largest weights among all magnet materials at present.

A typical sintered ferrite magnet is Sr ferrite having a magnetoplumbite structure, whose basic composition is represented by $SrFe_{12}O_{19}$. In late 1990s, sintered Sr—La—Co ferrite magnets having drastically improved magnetic properties by substituting part of $Sr^{2+}$ with $La^{3+}$ and part of $Fe^{3+}$ with $Co^{2+}$ in $SrFe_{12}O_{19}$, which may be called "SrLaCo magnets" for short below, were put into practical use. Also, in 2007, sintered Ca—La—Co ferrite magnets having further improved magnetic properties, which may be called "CaLaCo magnets" for short below, were put into practical use.

In both SrLaCo magnets and CaLaCo magnets described above, Co is indispensable to obtain high magnetic properties. SrLaCo magnets contain Co at atomic ratios of about 0.2 (Co/Fe=0.017, about 1.7% of the Fe content), and CaLaCo magnets contain Co at atomic ratios of as high as about 0.3 (Co/Fe=0.03, about 3% of the Fe content). Because cobalt oxide as a raw material of Co is ten to several tens of times as expensive as iron oxide, a main raw material of sintered ferrite magnets, CaLaCo magnets inevitably suffer higher material cost than SrLaCo magnets. Accordingly, more SrLaCo magnets with lower material cost are used than CaLaCo magnets at present, though CaLaCo magnets have higher magnetic properties.

As demand for Li ion batteries is increasing due to increase in electric vehicles, the price of Co is rapidly increasing in recent years. Due to such tendency, even SrLaCo magnets having excellent cost performance face difficulty in keeping their prices low. In such circumstances, it is imperative to reduce the use of Co in ferrite magnets while keeping their magnetic properties.

As a sintered Ca—La—Co ferrite magnet with a reduced Co content, WO 2008/105449 A discloses a sintered ferrite magnet having a ferrite phase having a hexagonal crystal structure as a main phase, the composition of metal elements constituting the main phase being represented by the general formula of $R_xCa_mA_{1-x-m}(Fe_{12-y}M_y)_z$, wherein R is at least one element selected from the group consisting of La, Ce, Pr, Nd and Sm, including La as an indispensable component; A is Sr and/or Ba; M is at least one element selected from the group consisting of Co, Zn, Ni, Mn, Al and Cr, including Co as an indispensable component; and x, m, y and z meet $0.2 \le x \le 0.5$, $0.13 \le m \le 0.41$, $0.7(x-m) \le 0.15$, $0.18 \le yz \le 0.31$, and $9.6 \le 12z \le 11.8$, respectively. In the above general formula, the Co content is 0.18-0.31 by atomic ratio.

However, in Examples of WO 2008/105449 A, the percentage of Sr to (Ca+La+Sr) is more than 0.5 by atomic ratio when the Co content is as small as 0.18 by atomic ratio, the Sr content being higher than the Ca content. Namely, in a region having a small Co content, the sintered ferrite magnets of WO 2008/105449 A have compositions close to those of Sr—La—Co-based, sintered ferrite magnets, indicating that WO 2008/105449 A does not describe examples of Ca—La—Co-based, sintered ferrite magnets containing more Ca than Sr when the Co content is 0.18 or less by atomic ratio.

JP 2018-30751 A discloses a Ca—La—Co ferrite compound having a hexagonal M-type magnetoplumbite structure and a composition by atomic ratio of metal elements of Ca, La, Fe and Co, which is represented by the general formula of $Ca_{1-x}La_xFe_{2n-z}Co_z$, wherein x, z and n meet $0.3 \le x \le 0.6$, $0.1 \le z \le 0.24$, and $4.5 \le n \le 5.5$. In this Ca—La—Co ferrite compound, the Co content is 0.1-0.24 by atomic ratio.

However, because the Ca—La—Co ferrite compound of JP 2018-30751 A does not contain Sr and/or Ba, the La content x is as high as $0.3 \le x \le 0.6$. In Examples of JP 2018-30751 A, Samples 1-4 have as high La contents x as 0.450-0.550, though the Co contents z are as low as 0.090-0.180. Particularly Samples 1 and 2 of Comparative Examples having as low Co contents z as 0.090 and 0.095 have as high La content x as 0.550, with low saturation magnetization σs and anisotropic magnetic field $H_A$. Also, even in Samples 3 and 4 having Co contents z of 0.134 and 0.180, the La contents x are as high as 0.524 and 0.450. To lower the material cost of sintered ferrite magnets, it is important to reduce not only the Co content but also the content of expensive La. Accordingly, the Ca—La—Co ferrite compound of JP 2018-30751 A is not sufficiently satisfactory from the aspect of cost reduction despite high performance.

Object of the Invention

Accordingly, an object of the present invention is to provide a sintered ferrite magnet having magnetic properties on the same level as or higher than those of conventional SrLaCo magnets and CaLaCo magnets, even with reduced Co content, and its production method, and calcined ferrite for providing such a sintered ferrite magnet.

SUMMARY OF THE INVENTION

Thus, the calcined ferrite of the present invention has a composition of metal elements of Ca, R, A, Fe and Co, which is represented by the general formula of $Ca_{1-x-y}R_xA_yFe_{2n-z}Co_z$, wherein R is at least one of rare earth elements indispensably including La; A is Sr and/or Ba; x, y, z and n represent the atomic ratios of Ca, R, A, Fe and Co; 2n represents a molar ratio expressed by $2n=(Fe+Co)/(Ca+R+A)$; and x, y, z and n meet the following conditions:

$0.30 \leq (1-x-y) \leq 0.55$, $0.25 \leq x \leq 0.35$, $0.15 \leq y \leq 0.40$, $(1-x-y) > y$, $0 < z \leq 0.18$, and $9.0 \leq (2n-z) < 11.0$.

In the calcined ferrite of the present invention, the atomic ratio (1−x−y) preferably meets $0.40 \leq (1-x-y) \leq 0.50$.

In the calcined ferrite of the present invention, the atomic ratio y preferably meets $0.20 \leq y \leq 0.35$.

In the calcined ferrite of the present invention, the atomic ratio z preferably meets $0 < z \leq 0.17$.

In the calcined ferrite of the present invention, the atomic ratio (2n−z) preferably meets $9.0 \leq (2n-z) \leq 10.5$.

In the calcined ferrite of the present invention, the atomic ratio (2n−z) preferably meets $9.0 \leq (2n-z) \leq 10.0$.

The sintered ferrite magnet of the present invention has a composition of metal elements of Ca, R, A, Fe and Co, which is represented by the general formula of $Ca_{1-x-y}R_xA_yFe_{2n-z}Co_z$, wherein R is at least one of rare earth elements indispensably including La; A is Sr and/or Ba; x, y, z and n represent the atomic ratios of Ca, R, A, Fe and Co; 2n represents a molar ratio expressed by $2n=(Fe+Co)/(Ca+R+A)$; and x, y, z and n meet the following conditions:

$0.15 \leq x \leq 0.35$, $0.05 \leq y \leq 0.40$, $(1-x-y) > y$, $0 < z \leq 0.18$, and $7.5 \leq (2n-z) < 11.0$.

In the sintered ferrite magnet of the present invention, the atomic ratio (1−x−y) preferably meets $0.40 \leq (1-x-y) \leq 0.50$.

In the sintered ferrite magnet of the present invention, the atomic ratio y preferably meets $0.20 \leq y \leq 0.35$.

In the sintered ferrite magnet of the present invention, the atomic ratio z preferably meets $0 < z \leq 0.17$.

In the sintered ferrite magnet of the present invention, the atomic ratio (2n− z) preferably meets $7.5 \leq (2n-z) \leq 10.5$.

In the sintered ferrite magnet of the present invention, the atomic ratio (2n− z) preferably meets $7.5 \leq (2n-z) \leq 10.0$.

The sintered ferrite magnet of the present invention may further contain more than 0% and 1.5% or less by mass of Si as $SiO_2$.

The method of the present invention for producing the above sintered ferrite magnet comprises the steps of mixing raw material powders containing metal elements of Ca, R, A, Fe and Co to prepare a raw material powder mixture having a metal element composition represented by the general formula of $Ca_{1-x-y}R_xA_yFe_{2n-z}Co_z$, wherein R is at least one of rare earth elements indispensably including La; A is Sr and/or Ba; x, y, z and n represent the atomic ratios of Ca, R, A, Fe and Co; 2n represents a molar ratio expressed by $2n=(Fe+Co)/(Ca+R+A)$; and x, y, z and n meet the following conditions:

$0.30 \leq (1-x-y) \leq 0.55$, $0.25 \leq x \leq 0.35$, $0.15 \leq y \leq 0.40$, $(1-x-y) > y$, $0 < z \leq 0.18$, and $9.0 \leq (2n-z) < 11.0$, calcining the resultant raw material powder mixture, pulverizing the resultant calcined body, molding the resultant calcined body powder, and sintering the resultant green body.

In the production method of the present invention, after the calcining step and before the molding step, (a) more than 0% and 1.5% or less by mass of $SiO_2$, or (b) more than 0% and 1.5% or less by mass of $SiO_2$ and more than 0% and 1.5% or less by mass of $CaCO_3$ as CaO may be added to 100% by mass of the calcined body or calcined body powder.

Effects of the Invention

The present invention can provide a sintered ferrite magnet having high $B_r$ and $H_{cJ}$ with a lower Co content than those of conventional SrLaCo magnets and CaLaCo magnets, by adjusting the composition of metal elements of Ca, R, A, Fe and Co. By having the composition of the present invention, magnetic properties higher than those of conventional SrLaCo magnets and comparable to those of conventional CaLaCo magnets can be obtained even with the Co content of 0.18 or less by atomic ratio, and further magnetic properties comparable to those of conventional SrLaCo magnets can be obtained even when the Co content is reduced to less than 0.15 by atomic ratio. Because the sintered ferrite magnet of the present invention, whose Co content is reduced while keeping magnetic properties on the same level as or higher than those of conventional SrLaCo magnets and/or CaLaCo magnets, has high performance with low cost, it can be suitably used for various motors, etc.

DESCRIPTION OF THE PREFERRED EMBODIMENTS

[1] Calcined Ferrite

The calcined ferrite of the present invention has a composition of metal elements of Ca, R, A, Fe and Co, which is represented by the general formula of $Ca_{1-x-y}R_xA_yFe_{2n-z}Co_z$, wherein R is at least one of rare earth elements indispensably including La; A is Sr and/or Ba; x, y, z and n represent the atomic ratios of Ca, R, A, Fe and Co; 2n represents a molar ratio expressed by $2n=(Fe+Co)/(Ca+R+A)$; and x, y, z and n meet the following conditions:

$0.30 \leq (1-x-y) \leq 0.55$, $0.25 \leq x \leq 0.35$, $0.15 \leq y \leq 0.40$, $(1-x-y) > y$, $0 < z \leq 0.18$, and $9.0 \leq 2n-z < 11.0$.

In the calcined ferrite of the present invention, R is at least one of rare earth elements indispensably including La. When other rare earth elements than La are contained, their amounts are preferably 50% or less by mol of the total amount of R. The atomic ratio x (R content) meets the condition of $0.25 \leq x \leq 0.35$. When the atomic ratio x is less than 0.25 or more than 0.35, high $B_r$ and $H_{cJ}$ cannot be obtained. The lower limit of the atomic ratio x is preferably 0.275, and the upper limit of the atomic ratio x is preferably 0.325. Accordingly, the preferred range of the atomic ratio x is 0.275-0.325.

A is Sr and/or Ba. The atomic ratio y (A content) meets the condition of $0.15 \leq y \leq 0.40$. When the atomic ratio y is less than 0.15 or more than 0.40, high $B_r$ and $H_{cJ}$ cannot be obtained. The range of the atomic ratio y is preferably $0.20 \leq y \leq 0.35$, more preferably $0.20 \leq y \leq 0.30$.

The atomic ratio (1− x−y) (Ca content) meets the condition of $0.30 \leq (1-x-y) \leq 0.55$. When the atomic ratio (1− x−y) is less than 0.30 or more than 0.55, high $B_r$ and $H_{cJ}$ cannot be obtained. The preferred range of the atomic ratio (1−x−y) is $0.40 \leq (1-x-y) \leq 0.50$.

The atomic ratio (1− x−y) (Ca content) and the atomic ratio y (A content) meet the relation of (1− x−y)>y. When this relation is not met, high $B_r$ and $H_{cJ}$ cannot be obtained.

The atomic ratio z (Co content) meets the condition of $0 < z \leq 0.18$. When the atomic ratio z is more than 0.18, the amount of Co used cannot be reduced sufficiently. On the other hand, the atomic ratio z of 0 (no Co contained) leads to low $H_{cJ}$. The upper limit of the atomic ratio z is preferably 0.17. Also, the lower limit of the atomic ratio z is preferably 0.08, more preferably 0.1. Accordingly, the preferred range of the atomic ratio z is $0 \leq z \leq 0.17$, and preferred examples of the atomic ratio z within this range are $0.08 \leq z \leq 0.18$, and $0.08 \leq z \leq 0.17$, $0.1 \leq z \leq 0.18$, $0.1 \leq z \leq 0.17$, etc.

The atomic ratio (2n− z) (Fe content) meets the condition of $9.0 \leq (2n-z) < 11.0$. When the atomic ratio (2n− z) is less than 9.0 or 11.0 or more, high $B_r$ and $H_{cJ}$ cannot be obtained. The range of the atomic ratio (2n− z) is preferably $9.0 \leq (2n-z) \leq 10.5$, further preferably $9.0 \leq (2n-z) \leq 10.0$.

While the composition of metal elements of Ca, R, A, Fe and Co is represented by the above general formula (atomic ratio), the composition including oxygen (O) is represented by the general formula of $Ca_{1-x-y}R_xA_yFe_{2n-z}Co_zO_\alpha$. The molar ratio α of oxygen is basically 19, though variable depending on the valences of Fe and Co, and the values of x, y and z and n. Also, the ratio of oxygen to metal elements changes depending on the vacancy of oxygen when sintered in a reducing atmosphere, the change of the valences of Fe and Co in a ferrite phase, etc. Accordingly, the molar ratio α of oxygen in actual calcined ferrite may be deviated from 19. Therefore, the present invention uses the composition of metal elements by atomic ratio, which can most easily identify the composition of the calcined or sintered ferrite.

A main phase constituting the calcined ferrite of the present invention is a compound phase (ferrite phase) having a hexagonal magnetoplumbite (M-type) structure. In general, magnetic materials, particularly sintered magnets, are composed of pluralities of compounds, and a compound determining their properties (physical properties, magnetic properties, etc.) is defined as a "main phase."

The term of "having a hexagonal magnetoplumbite (M-type) structure" means that an X-ray diffraction pattern of a hexagonal magnetoplumbite (M-type) structure is mainly observed when the X-ray diffraction of calcined ferrite is measured under general conditions.

[2] Production Method of Sintered Ferrite Magnet

The method of the present invention for producing a sintered ferrite magnet through the above calcined ferrite will be explained in detail below.

The method of the present invention for producing a sintered ferrite magnet comprises the steps of mixing raw material powders containing metal elements of Ca, R, A, Fe and Co to prepare a raw material powder mixture having a metal element composition represented by the above general formula of $Ca_{1-x-y}R_xA_yFe_{2n-z}Co_z$, in which x, y, z and n meet the following conditions:

$$0.30 \leq (1-x-y) \leq 0.55,$$

$$0.25 \leq x \leq 0.35,$$

$$0.15 \leq y \leq 0.40,$$

$$(1-x-y) > y,$$

$$0 < z \leq 0.18, \text{ and}$$

$$9.0 \leq (2n-z) < 11.0,$$

calcining the resultant raw material powder mixture,
pulverizing the resultant calcined body,
molding the resultant calcined body powder, and
sintering the resultant green body.

(1) Mixing Step of Raw Material Powders

Usable as raw material powders are compounds such as oxides, carbonates, hydroxides, nitrates, chlorides, etc. of these metals regardless of their valences. Ca compounds include carbonate, oxide, chloride, etc. of Ca. La compounds include oxides such as $La_2O_3$, etc., hydroxides such as $La(OH)_3$, etc., carbonates such as $La_2(CO_3)_3 \cdot 8H_2O$, etc. The compounds of the element A include carbonates, oxides, chlorides, etc. of Sr and/or Ba. Fe compounds include iron oxides, iron hydroxides, iron chlorides, mill scale, etc. Co compounds include oxides such as CoO, $Co_3O_4$, etc., hydroxides such as COOH, $Co(OH)_2$, etc., carbonates such as $CoCO_3$, etc., and basic carbonates such as $m_2CoCO_3 \cdot m_3Co(OH)_2 \cdot m_4H_2O$ ($m_2$, $m_3$ and $m_4$ are positive numbers), etc.

To accelerate a calcining reaction, up to about 1% by mass of B (boron)-containing compounds such as $B_2O_3$, $H_3BO_3$, etc. may be added to 100% by mass in total of raw material powders, if necessary. Particularly the addition of $H_3BO_3$ is effective for improving magnetic properties. The amount of $H_3BO_3$ added is preferably 0.3% or less by mass, and more preferably about 0.1% by mass. Because $H_3BO_3$ effectively controls the shape and size of crystal grains in sintering, it is added preferably after calcining (before fine pulverization or sintering), or may be added both before and after calcining.

Raw material powders meeting the above composition of the calcined ferrite of the present invention are mixed to obtain a raw material powder mixture. The mixing of the raw material powders may be conducted either in a wet or dry condition. By stirring with media such as steel balls, etc., the raw material powders can be mixed more uniformly. In the case of wet mixing, water is preferably used as a dispersion medium. To increase the dispersibility of the raw material powders, known dispersants such as ammonium polycarboxylates, calcium gluconate, etc. may be used. A raw material mixture slurry may be calcined before or after dewatering.

(2) Calcining Step

The raw material powder mixture obtained by dry or wet mixing is heated by an electric furnace, a gas furnace, etc. to form a ferrite compound having a hexagonal magnetoplumbite (M-type) structure by a solid phase reaction. This process is called "calcining," and the resultant compound is called "calcined body." Accordingly, the calcined ferrite of the present invention may be called "ferrite compound."

In the calcining step, a solid phase reaction forming a ferrite phase proceeds as the temperature rises. When the calcining temperature is lower than 1100° C., unreacted hematite ($Fe_2O_3$) remains, resulting in low magnetic properties. On the other hand, when the calcining temperature exceeds 1450° C., crystal grains grow too much, needing much time for a pulverization step. Accordingly, the calcining temperature is preferably 1100-1450° C. The calcining time is preferably 0.5-5 hours.

(3) Pulverizing Step of Calcined Body

The calcined body obtained through the above step is coarsely pulverized by a hammer mill, etc., and then finely pulverized by a vibration mill, a jet mill, a ball mill, an attritor, etc., to obtain a calcined body powder (finely pulverized powder). The calcined body powder preferably has an average particle size of about 0.4-1.2 μm, and more preferably about 0.4-0.8 μm. The average particle size of the calcined body powder is further preferably 0.5-0.65 μm when improvement in magnetic properties is important. The average particle size of powder is measured by an air permeability method using a specific surface area meter of powder (for example, SS-100 available from Shimadzu Corporation), etc. The pulverization step of the calcined body may be conducted by dry or wet pulverization or both. In the case of wet pulverization, water and/or a non-aqueous solvent (an organic solvent such as acetone, ethanol, xylene, etc.) are used as a dispersion medium. Typically, a slurry comprising the calcined body and water (dispersion medium) is formed. A known dispersant and/or surfactant in an amount of 0.2-2% by mass on a solid basis may be added to the slurry. After the wet pulverization, the slurry may be concentrated.

(4) Molding Step of Calcined Body Powder

In the molding step, the slurry after the pulverization step is press-molded in or without a magnetic field while removing the dispersion medium. By press molding in a magnetic field, the crystal orientation of powder particles can be aligned (oriented), to drastically increase magnetic properties. To improve the orientation, 0.1-1% by mass each of a dispersant and a lubricant may be added to 100% by mass of the slurry before molding. Before molding, the slurry may be concentrated if necessary. The concentration is preferably conducted by centrifugal separation, filter-pressing, etc.

After the calcining step and before the molding step, a sintering additive may be added to the calcined body or calcined body powder (coarsely or finely pulverized powder). The sintering additives are preferably $SiO_2$ alone, or both $SiO_2$ and $CaCO_3$. The sintered ferrite magnet of the present invention is categorized in a CaLaCo magnet as is clear from its composition. Because the CaLaCo magnet contains Ca as a main phase component, a liquid phase enabling sintering is formed without adding sintering additives such as $SiO_2$, $CaCO_3$, etc., unlike in SrLaCo magnets. Namely, without adding $SiO_2$ and $CaCO_3$ mainly forming grain boundary phases in sintered ferrite magnets, the sintered ferrite magnet of the present invention can be produced. However, to suppress decrease in $H_J$, $SiO_2$ and $CaCO_3$ in amounts described below may be added as sintering additives.

The amount of $SiO_2$ if added is preferably more than 0% and 1.5% or less by mass per 100% by mass of the calcined body or calcined body powder. Also, the amount of $CaCO_3$ if added is preferably more than 0% and 1.5% or less by mass as CaO per 100% by mass of the calcined body or calcined body powder. The addition of sintering additives may be either before, during or after the pulverizing step, as long as it is before molding. In addition to $SiO_2$ and $CaCO_3$, $Cr_2O_3$, $Al_2O_3$, etc. may be added as sintering additives. Their amounts may be 1% or less by mass each.

The amount of $CaCO_3$ added is converted to the amount of CaO. The amount (% by mass) of $CaCO_3$ added is calculated from the amount of CaO (% by mass) by the formula of (molecular weight of $CaCO_3$×amount of CaO)/molecular weight of CaO. For example, when 0.5% by mass of $CaCO_3$ as CaO is to be added, the amount of $CaCO_3$ added is (100.09×0.5% by mass)/56.08=0.892% by mass, because the molecular weight of $CaCO_3$ is 100.09=40.08 (atomic weight of Ca)+12.01 (atomic weight of C)+48.00 (atomic weight of O×3), and the molecular weight of CaO is 56.08=40.08 (atomic weight of Ca)+16.00 (atomic weight of O).

(5) Sintering Step of Green Body

A green body obtained by press molding is degreased if necessary, and then sintered. The sintering is conducted in an electric furnace, a gas furnace, etc. The sintering is conducted in an atmosphere having an oxygen concentration of preferably 10% or more by volume. The oxygen concentration in the sintering atmosphere is more preferably 20% or more by volume, and most preferably 100% by volume. The sintering temperature is preferably 1150-1250° C. The time of keeping the sintering temperature (sintering time) is preferably 0 hour (no holding time at sintering temperature) to 2 hours.

As shown in Examples below, the present invention uses, for example, (a) a sintering condition comprising increasing the temperature at an average rate of 400° C./hour in a temperature range from room temperature to the sintering temperature, keeping the sintering temperature for a predetermined period of time (sintering time) (including no holding time), and then lowering the temperature at an average rate of 300° C./hour in a temperature range from the sintering temperature to 800° C., (b) a sintering condition comprising increasing the temperature at an average rate of 600° C./hour or more and 1000° C./hour or less in a temperature range from 800° C. to the sintering temperature, keeping the sintering temperature for the sintering time (including no holding time), and then lowering the temperature at an average rate of 1000° C./hour or more in a temperature range from the sintering temperature to 800° C., etc.

The latter sintering condition (b) can shorten a lead time because of very high temperature-increasing and temperature-lowering rates. Though the temperature-increasing rate in a temperature range of up to 800° C. is not particularly restricted, it is preferably the same as the temperature-increasing rate in a temperature range from 800° C. to the sintering temperature, taking into account the shortening of a lead time. Namely, the average temperature-increasing rate is preferably 600° C./hour or more and 1000° C./hour or less in an entire temperature range from room temperature or a temperature in the furnace (preheating temperature, etc.) to the sintering temperature. Further, though the temperature-lowering rate in a temperature range from 800° C. to near room temperature is not particularly restricted, it is preferably the same as or close to the temperature-lowering rate in a temperature range from the sintering temperature to 800° C., taking into account the shortening of a lead time. Incidentally, the temperature used in the embodiments of the present invention represents the temperature of an object to be heat-treated (green body or sintered body). The measurement of the temperature is conducted by an R-type thermocouple in contact with the object to be heat-treated in a sintering furnace.

After the sintering step, a final sintered ferrite magnet is produced through known production steps such as a machining step, a cleaning step, an inspection step, etc.

[3] Sintered Ferrite Magnet

The sintered ferrite magnet of the present invention obtained through the above steps has a composition of metal elements of Ca, R, A, Fe and Co, which is represented by the general formula of $Ca_{1-x-y}R_xA_yFe_{2n-z}Co_z$, wherein R is at least one of rare earth elements indispensably including La; A is Sr and/or Ba; x, y, z and n represent the atomic ratios of Ca, R, A, Fe and Co; 2n represents a molar ratio expressed by $2n=(Fe+Co)/(Ca+R+A)$; and x, y, z and n meet the following conditions:

$0.15 \leq x \leq 0.35$, $0.05 \leq y \leq 0.40$, $(1-x-y) > y$, $0 < z \leq 0.18$, and $7.5 \leq (2n-z) < 11.0$.

Because a liquid phase is generated in the calcined ferrite of the present invention without adding $SiO_2$ and $CaCO_3$ as sintering additives, enabling the sintering of the calcined ferrite as described above, the composition of the sintered ferrite magnet is basically the same as that of the calcined ferrite when $CaCO_3$ is not added, as long as impurities which may be contained during the production steps are not taken into account.

On the other hand, when $CaCO_3$ is added as a sintering additive, the sintered ferrite magnet has a higher percentage of Ca than in the calcined body, with lower percentages of other elements. For example, when 1.5% by mass of $CaCO_3$ as CaO is added as a sintering additive to the calcined ferrite of the present invention, the amounts of R, A and Fe are changed at maximum from $0.25 \leq x \leq 0.35$, $0.15 \leq y \leq 0.40$, and $9.0 \leq (2n-z) < 11.0$ in the calcined body, to $0.15 \leq x \leq 0.35$, $0.05 \leq y \leq 0.40$, and $7.5 \leq (2n-z) < 11.0$ in the sintered magnet.

The preferred ranges of the atomic ratios $(1-x-y)$, y and z in the sintered ferrite magnet are $0.40 \leq (1-x-y) \leq 0.50$, $0.20 \leq y \leq 0.35$, and $0 < z \leq 0.17$. Also, the range of the atomic ratio $(2n-z)$ in the sintered ferrite magnet is preferably $7.5 \leq (2n-z) \leq 10.5$, and further preferably $7.5 \leq (2n-z) \leq 10.0$. The lower limit, upper limit and range of the Co content z in the sintered ferrite magnet may be the same as in the calcined ferrite.

The composition including oxygen (O) and the definitions of a main phase and a hexagonal magnetoplumbite (M-type) structure in the sintered ferrite magnet of the present invention are the same as those of the calcined ferrite of the present invention. Though the ranges of the atomic ratios x, y and (2n−z) in the sintered ferrite magnet differ from those in the calcined ferrite, reasons for limiting the atomic ratios x, y, z and (2n−z) in the sintered ferrite magnet are the same as in the calcined ferrite. Accordingly, their explanations are omitted. Incidentally, the range of the atomic ratio $(1-x-y)$ also inevitably changes by the changes of the ranges of the atomic ratios x and y.

When more than 0% and 1.5% or less by mass of $SiO_2$ is added as a sintering additive to 100% by mass of the calcined body or the calcined body powder, $SiO_2$ forms a liquid phase during sintering, constituting one component in grain boundary phases in the sintered ferrite magnet, the resultant sintered ferrite magnet contains more than 0% and 1.5% or less by mass of Si as $SiO_2$. Though the inclusion of Si results in relative decrease in the amounts of metal elements of Ca, R, A, Fe and Co in the sintered ferrite magnet, the percentage of each metal element does not change in the general formula of $Ca_{1-x-y}R_xA_yFe_{2n-z}Co_z$. Incidentally, the Si content as $SiO_2$ is determined by converting the percentages (% by mass) of Ca, Sr, Ba, La, Fe, Co and Si measured by the component analysis (for example, ICP atomic emission spectroscopy) of the sintered ferrite magnet to the percentages (% by mass) of $CaCO_3$, $SrCO_3$, $BaCO_3$, $La(OH)_3$, $Fe_2O_3$, $Co_3O_4$ and $SiO_2$. In the case of containing other rare earth elements R' than La, the Si content as $SiO_2$ is similarly determined by converting the percentages (% by mass) of Ca, Sr, Ba, La, R', Fe, Co and Si to the percentages (% by mass) of $CaCO_3$, $SrCO_3$, $BaCO_3$, $La(OH)_3$, R' oxide, $Fe_2O_3$, $Co_3O_4$ and $SiO_2$.

The present invention will be explained in further detail by Examples below, without intention of restricting the present invention thereto.

Example 1

$CaCO_3$ powder, $La(OH)_3$ powder, $SrCO_3$ powder, $Fe_2O_3$ powder and $Co_3O_4$ powder were formulated at percentages giving the atomic ratios $(1-x-y)$, x, y, z and $(2n-z)$ shown in Table 1, in the general formula of $Ca_{1-x-y}La_xSr_yFe_{2n-z}Co_z$ showing a composition of metal elements of Ca, R, A, Fe and Co, and mixed for 4 hours in a wet ball mill with 0.1% by mass of $H_3BO_3$ powder added to 100% by mass in total of them. Each of the resultant mixtures was dried and granulated to obtain 30 types of raw material powder mixtures (Samples 1-30).

All of 30 types of the raw material powder mixtures were calcined at the calcining temperatures shown in Table 1 for 3 hours in the air, to obtain 30 types of calcined bodies.

Each calcined body was coarsely pulverized by a small mill to obtain each coarse calcined body powder. With $CaCO_3$ powder (amount expressed as CaO) and $SiO_2$ powder in the amounts shown in Table 1 added to 100% by mass of each coarse calcined body powder, each coarse calcined body powder was finely pulverized in a wet ball mill containing water as a dispersion medium to an average particle size [measured by an air permeability method using a specific surface area meter of powder (SS-100 available from Shimadzu Corporation)] shown in Table 1, to obtain 30 types of finely pulverized slurries.

Each finely pulverized slurry was press-molded under pressure of about 2.4 MPa in a magnetic field of about 1 T, in a parallel-magnetic-field molding machine (vertical-magnetic-field molding machine), in which the direction of pressing was in parallel with the direction of a magnetic field, while removing water, to obtain 30 types of green bodies.

Each green body was placed in a sintering furnace, and sintered under the sintering condition A or B shown in Table 1. In the sintering condition A, the temperature was increased at an average rate of 1000° C./hour in a temperature range from room temperature to the sintering temperature shown in Table 1, while flowing air at a flow rate of 10 L/minute in the sintering furnace, and sintering was conducted at that sintering temperature for 1 hour. After sintering, a heater in the sintering furnace was shut off, and the flow rate of air was changed from 10 L/minute to 40 L/minute, to lower the temperature at an average rate of 1140° C./hour in a temperature range from the sintering temperature to 800° C. The resultant sintered body was then left to cool to room temperature in the furnace. In the sintering condition B, the temperature was increased at an average rate of 400° C./hour in a temperature range from room temperature to the sintering temperature shown in Table 1, while flowing air at a flow rate of 10 L/minute in the sintering furnace, and sintering was conducted at that sintering temperature for 1 hour. After sintering, a heater in the sintering furnace was shut off to lower the temperature at an average rate of 300° C./hour in a temperature range from the sintering temperature to 800° C., with the flow rate of air kept at 10 L/minute. The resultant sintered body was then left to cool to room temperature in the furnace.

With respect to 30 types of the sintered ferrite magnets, the measurement results of $B_r$, $H_{cJ}$ and $H_k/H_{cJ}$ are shown in Table 1. In Table 1, Samples 4 and 7 with * do not meet the composition conditions of the present invention, because the atomic ratios x of the rare earth element in their calcined bodies were less than 0.25. Other Samples (without *) than Samples 4 and 7 meet the composition conditions of the present invention. Incidentally, in a J-H curve, wherein J represents magnetization, and H represents the intensity of a magnetic field, $H_k$ is a value of H at a position at which J is $0.95 \times J_r$ ($J_r$ is residual magnetization=$B_r$) in the second quadrant.

Table 1 shows atomic ratios when the raw material powders were formulated (formulation compositions). The atomic ratios in the sintered ferrite magnet (composition of the sintered magnet) can be calculated from the formulation composition, taking into account the amounts of $H_3BO_3$, etc. added before the calcining step and sintering additives ($CaCO_3$ and $SiO_2$) added after the calcining step and before the molding step, and the calculated values are basically the same as the values obtained by analyzing the sintered ferrite magnet by an ICP atomic emission spectroscope (for example, ICPV-1017 available from Shimadzu Corporation, etc.). The same is true in the atomic ratios in Table 2.

TABLE 1

| Sample No. | Atomic Ratio | | | | |
|---|---|---|---|---|---|
| | Ca $1-x-y$ | La $x$ | Sr $y$ | Co $z$ | Fe $2n-z$ |
| 1 | 0.50 | 0.30 | 0.20 | 0.13 | 9.50 |
| 2 | 0.50 | 0.30 | 0.20 | 0.13 | 9.50 |
| 3 | 0.50 | 0.25 | 0.25 | 0.13 | 9.50 |
| 4* | 0.50 | 0.20 | 0.30 | 0.13 | 9.50 |
| 5 | 0.45 | 0.30 | 0.25 | 0.13 | 9.50 |
| 6 | 0.45 | 0.25 | 0.30 | 0.13 | 9.50 |
| 7* | 0.45 | 0.20 | 0.35 | 0.13 | 9.50 |
| 8 | 0.45 | 0.30 | 0.25 | 0.10 | 9.50 |
| 9 | 0.45 | 0.30 | 0.25 | 0.10 | 9.50 |
| 10 | 0.45 | 0.30 | 0.25 | 0.11 | 9.50 |
| 11 | 0.45 | 0.30 | 0.25 | 0.11 | 9.50 |
| 12 | 0.45 | 0.30 | 0.25 | 0.12 | 9.50 |
| 13 | 0.45 | 0.30 | 0.25 | 0.12 | 9.50 |
| 14 | 0.45 | 0.30 | 0.25 | 0.15 | 9.50 |
| 15 | 0.45 | 0.30 | 0.25 | 0.15 | 9.50 |
| 16 | 0.45 | 0.30 | 0.25 | 0.18 | 9.50 |
| 17 | 0.45 | 0.30 | 0.25 | 0.18 | 9.50 |
| 18 | 0.40 | 0.30 | 0.30 | 0.13 | 9.50 |
| 19 | 0.45 | 0.275 | 0.275 | 0.15 | 9.50 |
| 20 | 0.45 | 0.275 | 0.275 | 0.15 | 9.50 |
| 21 | 0.45 | 0.325 | 0.225 | 0.15 | 9.50 |
| 22 | 0.45 | 0.325 | 0.225 | 0.15 | 9.50 |
| 23 | 0.425 | 0.325 | 0.25 | 0.15 | 9.50 |
| 24 | 0.425 | 0.325 | 0.25 | 0.15 | 9.50 |
| 25 | 0.45 | 0.30 | 0.25 | 0.17 | 9.50 |
| 26 | 0.45 | 0.30 | 0.25 | 0.17 | 9.50 |
| 27 | 0.45 | 0.325 | 0.225 | 0.17 | 9.50 |
| 28 | 0.45 | 0.325 | 0.225 | 0.17 | 9.50 |
| 29 | 0.45 | 0.35 | 0.20 | 0.17 | 9.50 |
| 30 | 0.45 | 0.35 | 0.20 | 0.17 | 9.50 |

| Sample No. | Calcining Temp. (° C.) | Amount (% by mass) | | Average Particle Size[1] (μm) | Sintering Condition | Sintering Temp. (° C.) |
|---|---|---|---|---|---|---|
| | | $CaCO_3$ | $SiO_2$ | | | |
| 1 | 1200 | 0.700 | 0.825 | 0.60 | A | 1200 |
| 2 | 1200 | 0.700 | 0.775 | 0.60 | A | 1210 |
| 3 | 1200 | 0.700 | 0.800 | 0.60 | A | 1200 |
| 4* | 1200 | 0.700 | 0.800 | 0.60 | A | 1200 |
| 5 | 1200 | 0.700 | 0.800 | 0.60 | A | 1200 |
| 6 | 1200 | 0.700 | 0.825 | 0.60 | A | 1200 |
| 7* | 1200 | 0.700 | 0.800 | 0.60 | A | 1200 |
| 8 | 1200 | 0.700 | 0.925 | 0.60 | A | 1200 |
| 9 | 1200 | 0.700 | 0.925 | 0.60 | B | 1200 |
| 10 | 1200 | 0.700 | 0.900 | 0.60 | A | 1200 |
| 11 | 1200 | 0.700 | 0.875 | 0.60 | B | 1200 |
| 12 | 1200 | 0.700 | 0.825 | 0.60 | A | 1200 |
| 13 | 1200 | 0.700 | 0.875 | 0.60 | B | 1200 |
| 14 | 1200 | 0.700 | 0.850 | 0.60 | A | 1200 |
| 15 | 1200 | 0.700 | 0.900 | 0.60 | B | 1200 |
| 16 | 1200 | 0.700 | 0.850 | 0.60 | A | 1200 |
| 17 | 1200 | 0.700 | 0.850 | 0.60 | B | 1200 |
| 18 | 1200 | 0.700 | 0.950 | 0.60 | A | 1200 |
| 19 | 1200 | 0.700 | 0.800 | 0.60 | A | 1200 |
| 20 | 1200 | 0.700 | 0.800 | 0.60 | B | 1200 |
| 21 | 1200 | 0.700 | 0.800 | 0.60 | A | 1200 |
| 22 | 1200 | 0.700 | 0.800 | 0.60 | B | 1200 |
| 23 | 1200 | 0.700 | 0.800 | 0.60 | A | 1200 |
| 24 | 1200 | 0.700 | 0.900 | 0.60 | B | 1200 |
| 25 | 1200 | 0.700 | 0.800 | 0.60 | A | 1200 |
| 26 | 1200 | 0.700 | 0.750 | 0.60 | B | 1200 |
| 27 | 1200 | 0.700 | 0.800 | 0.60 | A | 1200 |
| 28 | 1200 | 0.700 | 0.800 | 0.60 | B | 1200 |
| 29 | 1200 | 0.700 | 0.750 | 0.60 | A | 1200 |
| 30 | 1200 | 0.700 | 0.800 | 0.60 | B | 1200 |

Note:
[1]Average particle size of pulverized powder in the finely pulverized slurry.

| Sample No. | $B_r$ (T) | $H_{cJ}$ (kA/m) | $H_k/H_{cJ}$ (%) |
|---|---|---|---|
| 1 | 0.439 | 355 | 90.4 |
| 2 | 0.441 | 348 | 89.0 |
| 3 | 0.435 | 304 | 89.1 |
| 4* | 0.432 | 270 | 88.3 |
| 5 | 0.436 | 375 | 88.3 |
| 6 | 0.436 | 355 | 86.2 |
| 7* | 0.429 | 312 | 82.1 |
| 8 | 0.435 | 347 | 93.1 |
| 9 | 0.437 | 342 | 88.2 |
| 10 | 0.437 | 353 | 93.1 |
| 11 | 0.437 | 323 | 91.6 |
| 12 | 0.436 | 362 | 90.5 |
| 13 | 0.439 | 347 | 89.9 |
| 14 | 0.437 | 390 | 83.7 |
| 15 | 0.440 | 377 | 84.4 |
| 16 | 0.437 | 393 | 73.4 |
| 17 | 0.442 | 374 | 78.3 |
| 18 | 0.433 | 391 | 89.2 |
| 19 | 0.435 | 380 | 84.0 |
| 20 | 0.438 | 352 | 89.8 |
| 21 | 0.437 | 394 | 85.0 |
| 22 | 0.440 | 366 | 91.5 |
| 23 | 0.437 | 387 | 86.8 |
| 24 | 0.439 | 389 | 91.5 |
| 25 | 0.439 | 397 | 78.3 |
| 26 | 0.440 | 370 | 86.2 |
| 27 | 0.440 | 405 | 82.7 |
| 28 | 0.440 | 377 | 88.5 |
| 29 | 0.442 | 407 | 87.6 |
| 30 | 0.440 | 395 | 90.3 |

As shown in Table 1, Samples 1-3, 5, 6, 8-13 and 18 having atomic ratios z (Co contents) of less than 0.15 with the atomic ratios of other metal elements adjusted to meet the composition conditions of the present invention had $B_r$ of 0.433-0.441 T and $H_{cJ}$ of 304-391 kA/m. This indicates that sintered ferrite magnets meeting the composition conditions of the present invention had magnetic properties on the same level as those of conventional SrLaCo magnets, even with smaller Co contents than in conventional SrLaCo magnets.

Also, Samples 14-17 and 19-30 having atomic ratios z (Co contents) of 0.15-0.18 with the atomic ratios of other metal elements adjusted to meet the composition conditions of the present invention had $B_r$ of 0.435-0.442 T and $H_{cJ}$ of 352-407 kA/m, exhibiting magnetic properties exceeding those of conventional SrLaCo magnets, with Co contents on the same level as in conventional SrLaCo magnets. Particularly, the sintered ferrite magnets having atomic ratios x (La contents) in a range of 0.325≤x≤0.35 and atomic ratios z (Co contents) in a range of 0.17≤z≤0.18 had magnetic properties comparable to those of conventional CaLaCo magnets (La content: about 0.5 by atomic ratio, and Co content: about 0.3 by atomic ratio), with reduced La and Co contents than in the conventional CaLaCo magnets.

On the other hand, Samples 4 and 7 having atomic ratios x (La contents) of 0.20 exhibited $B_r$ of 0.432 T or less and $H_{cJ}$ of 312 kA/m or less, lower magnetic properties than in conventional SrLaCo magnets, because they did not meet the condition of 0.25≤x≤0.35 in the present invention.

As is clear from Table 1, pairs of Samples (8 and 9, 10 and 11, 12 and 13, 14 and 15, 16 and 17, 19 and 20, 21 and 22, 23 and 24, 25 and 26, 27 and 28, and 29 and 30) each having the same composition (the amount of $SiO_2$ may differ slightly), which were produced under different sintering conditions A and B, had high $B_r$ and $H_{cJ}$ regardless of their sintering conditions. Particularly, sintering under the condition A tended to provide higher $H_{cJ}$, and sintering under the condition B tended to provide higher $B_r$.

Samples 16 and 17 having atomic ratios z (Co contents) of 0.18 and meeting the composition conditions of the present invention exhibited high $B_r$ and $H_{cJ}$, despite slightly low $H_k/H_{cJ}$. On the other hand, Samples 25-30 having atomic ratios z (Co contents) of 0.17 exhibited high $B_r$ and $H_{cJ}$ as well as high $H_k/H_{cJ}$. These results indicate that the atomic ratio z (Co content) in a range of 0<z≤0.17 is preferable for applications needing high $H_k/H_{cJ}$.

Example 2

7 types of sintered ferrite magnets (Samples 31-37) were produced in the same manner as in Example 1, except for changing the atomic ratio z (Co content) (Samples 31 and 32) and the atomic ratio (2n− z) (Fe content) (Samples 34-37), or using Ba as the element A (Sample 33), in the general formula of $Ca_{1-x-y}La_xA_yFe_{2n-z}Co_z$. All Samples 31-37 meet the composition conditions of the present invention. With respect to each sample, the formulation composition, the calcining temperature, the amounts of $CaCO_3$ (as CaO) and $SiO_2$ added, the average particle size after ball milling, the sintering condition, and the sintering temperature, as well as the $B_r$, $H_{cJ}$ and $H_k/H_{cJ}$ of the sintered ferrite magnet are shown in Table 2.

TABLE 2

| | Atomic Ratio | | | | | |
|---|---|---|---|---|---|---|
| Sample No. | Ca 1 − x − y | La x | Sr y | Ba y | Co z | Fe 2n − z |
| 31 | 0.45 | 0.30 | 0.25 | 0 | 0.09 | 9.50 |
| 32 | 0.45 | 0.30 | 0.25 | 0 | 0.08 | 9.50 |
| 33 | 0.45 | 0.30 | 0 | 0.25 | 0.15 | 9.50 |
| 34 | 0.45 | 0.30 | 0.25 | 0 | 0.10 | 9.00 |
| 35 | 0.45 | 0.30 | 0.25 | 0 | 0.11 | 9.00 |
| 36 | 0.45 | 0.30 | 0.25 | 0 | 0.15 | 9.00 |
| 37 | 0.45 | 0.30 | 0.25 | 0 | 0.15 | 10.00 |

| Sample No. | Calcining Temp. (° C.) | Amount (% by mass) | | Average Particle Size[1] (μm) | Sintering Condition | Sintering Temp. (° C.) |
|---|---|---|---|---|---|---|
| | | $CaCO_3$ | $SiO_2$ | | | |
| 31 | 1200 | 0.700 | 0.900 | 0.60 | A | 1200 |
| 32 | 1200 | 0.700 | 0.900 | 0.60 | A | 1200 |
| 33 | 1200 | 0.700 | 0.900 | 0.60 | A | 1200 |
| 34 | 1200 | 0.700 | 1.050 | 0.60 | A | 1200 |
| 35 | 1200 | 0.700 | 1.050 | 0.60 | A | 1200 |
| 36 | 1200 | 0.700 | 1.000 | 0.60 | A | 1200 |
| 37 | 1200 | 0.700 | 0.700 | 0.60 | A | 1200 |

Note:
[1]Average particle size of pulverized powder in the finely pulverized slurry.

| Sample No. | $B_r$ (T) | $H_{cJ}$ (kA/m) | $H_k/H_{cJ}$ (%) |
|---|---|---|---|
| 31 | 0.435 | 346 | 92.1 |
| 32 | 0.435 | 334 | 93.3 |
| 33 | 0.436 | 331 | 83.8 |
| 34 | 0.434 | 356 | 94.0 |
| 35 | 0.431 | 370 | 93.4 |
| 36 | 0.432 | 424 | 84.3 |
| 37 | 0.430 | 376 | 88.9 |

As is clear from Table 2, Samples 31 and 32 having lower atomic ratios z (Co contents z<0.10) than in Example 1 (z≥0.10) had $B_r$ of 0.435 T and $H_{cJ}$ of 334-346 kA/m. This indicates that as long as the composition conditions of the present invention are met, sintered ferrite magnets having magnetic properties on the same level as those of conventional SrLaCo magnets can be obtained even though the Co content is lower than in Example 1.

Sample 33 comprising Ba in place of Sr as the element A had $B_r$ on the same level as that of Sample 14 in Example 1, which had substantially the same composition except for comprising Sr as the element A, and slightly lower $H_{cJ}$ than that of Sample 14, but the $H_{cJ}$ of Sample 33 was on the same level as those of conventional SrLaCo magnets. This indicates that as long as the composition conditions of the present invention are met, sintered ferrite magnets having magnetic properties on the same level as or higher than those of conventional SrLaCo magnets can be obtained even though Ba is used in place of Sr.

It was found that Samples 34-36 having atomic ratios (2n− z) of the Fe content=9.00, which was lower than in Example 1 (9.50) within the composition range of the present invention, had higher $H_{cJ}$ than those of Samples in Example 1 having the same atomic ratios z (Co contents) as those of Samples 34-36, and that increase in the atomic ratio z (Co content) from 0.10 to 0.15 resulted in higher $H_{cJ}$. Also, Sample 37 having a higher atomic ratio (2n− z) of the Fe content=10.00 than in Example 1 (9.50) within the composition range of the present invention had $B_r$ slightly lower than in Example 1 but on the same level as those of conventional SrLaCo magnets.

What is claimed is:

1. A sintered ferrite magnet having a composition of metal elements of Ca, R, A, Fe and Co, which is represented by the general formula of $Ca_{1-x-y}R_xA_yFe_{2n-z}Co_z$, wherein R is at least one of rare earth elements indispensably including La; A is Sr; x, y', z and n represent the atomic ratios of Ca, R, A, Fe and Co; 2n represents a molar ratio expressed by 2n=(Fe+Co)/(Ca+R+A); and x, y', z and n meet the following conditions:

0.425≤(1−x−y')≤0.55, 0.15≤x≤0.35, 0.05≤y'≤0.40, (1−x−y')>y', $0 < z \leq 0.18$, and $7.5 \leq (2n-z) < 11.0$, wherein said sintered ferrite magnet further contains more than 0% and 1.0% or less by mass of Si as $SiO_2$.

2. The sintered ferrite magnet according to claim 1, wherein said atomic ratio $(1-x-y')$ meets $0.425 > (1-x-y') \leq 0.50$.

3. The sintered ferrite magnet according to claim 1, wherein said atomic ratio $y'$ meets $0.20 \leq y' \leq 0.40$.

4. The sintered ferrite magnet according to claim 1, wherein said atomic ratio $y'$ meets $0.20 \leq y' \leq 0.35$.

5. The sintered ferrite magnet according to claim 1, wherein said atomic ratio $z$ meets $0 \leq z \leq 0.17$.

6. The sintered ferrite magnet according to claim 1, wherein said atomic ratio $z$ meets $0 \leq z \leq 0.15$.

7. The sintered ferrite magnet according to claim 1, wherein said atomic ratio $(2n-z)$ meets $7.5 \leq (2n-z) \leq 10.5$.

8. The sintered ferrite magnet according to claim 1, wherein said atomic ratio $(2n-z)$ meets $7.5 \leq (2n-z) \leq 10.0$.

9. The sintered ferrite magnet according to claim 1, wherein said atomic ratios $z$ and $(2n-z)$ meet $0.0084 \leq z/(2n-z) \leq 0.0167$.

10. A method for producing the sintered ferrite magnet recited in claim 1, comprising the steps of mixing raw material powders containing metal elements of Ca, R, A, Fe and Co to prepare a raw material powder mixture having a metal element composition represented by the general formula of $Ca_{1-x-y'}R_xA_{y'}Fe_{2n-z}Co_z$, wherein R is at least one of rare earth elements indispensably including La; A is Sr; x, y', z and n represent the atomic ratios of Ca, R, A, Fe and Co; 2n represents a molar ratio expressed by $2n=(Fe+Co)/(Ca+R+A)$; and x, y', z and n meet the following conditions:

$0.425 \leq (1-x-y') \leq 0.55$, $0.15 \leq x \leq 0.35$, $0.05 \leq y' \leq 0.40$, $(1-x-y') > y'$, $0 < z \leq 0.18$, and $9.0 \leq 2n-z < 11.0$, calcining the resultant raw material powder mixture,
pulverizing the resultant calcined body,
molding the resultant calcined body powder, and
sintering the resultant green body, wherein more than 0% and 1.0% or less by mass of $SiO_2$ is added to 100% by mass of said calcined body or calcined body powder, after said calcining step and before said molding step.

11. The method for producing a sintered ferrite magnet according to claim 10, wherein more than 0% and 1.5% or less by mass of $CaCO_3$ as CaO is further added to 100% by mass of said calcined body or calcined body powder, after said calcining step and before said molding step.

12. The method for producing a sintered ferrite magnet according to claim 10, wherein more than 0% and 0.7% or less by mass of $CaCO_3$ as CaO is further added to 100% by mass of said calcined body or calcined body powder, after said calcining step and before said molding step.

13. The method for producing a sintered ferrite magnet according to claim 10, wherein said atomic ratio $(1-x-y')$ meets $0.425 \leq (1-x-y') \leq 0.50$.

14. The method for producing a sintered ferrite magnet according to claim 10, wherein said atomic ratio $z$ meets $0 < z \leq 0.15$.

15. The method for producing a sintered ferrite magnet according to claim 10, wherein said atomic ratios $z$ and $(2n-z)$ meet $0.0084 \leq z/(2n-z) \leq 0.0167$.

* * * * *